United States Patent
Calo et al.

(10) Patent No.: US 10,334,025 B2
(45) Date of Patent: Jun. 25, 2019

(54) ADAPTIVE QUERY TARGETING IN A DYNAMIC DISTRIBUTED ENVIRONMENT

(71) Applicant: International Business Machines Corporation, Armonk, NY (US)

(72) Inventors: Seraphin B. Calo, Cortlandt Manor, NY (US); Geeth R. de Mel, Chester (GB); Keith W. Grueneberg, Stewart Manor, NY (US); Jorge J. Ortiz, New York, NY (US); Xiping Wang, Scarsdale, NY (US); David A. Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/177,104

(22) Filed: Jun. 8, 2016

(65) Prior Publication Data

US 2017/0359406 A1 Dec. 14, 2017

(51) Int. Cl.
*H04L 29/08* (2006.01)

(52) U.S. Cl.
CPC ............ *H04L 67/10* (2013.01); *H04L 67/02* (2013.01); *H04L 67/16* (2013.01)

(58) Field of Classification Search
CPC .......... H04L 67/02; H04L 67/10; H04L 67/16
USPC ........................................... 709/223
See application file for complete search history.

(56) References Cited

U.S. PATENT DOCUMENTS

| 7,263,070 | B1 * | 8/2007 | Delker ............. H04L 29/12207 370/254 |
| 7,263,560 | B2 | 8/2007 | Abdelaziz et al. |
| 7,716,286 | B2 * | 5/2010 | Heins ..................... G06Q 10/10 709/201 |
| 2004/0044727 | A1 * | 3/2004 | Abdelaziz .......... H04L 61/3065 709/203 |
| 2005/0193106 | A1 * | 9/2005 | Desai .................... H04W 84/18 709/223 |
| 2007/0214046 | A1 * | 9/2007 | Falchuk ................. G06Q 10/06 705/14.42 |

(Continued)

OTHER PUBLICATIONS

Adjie-Winoto et al., "The design and Implementation of an intentional naming system," 17th ACM Symposium on Operating Systems Principles (SOSP '99), Operating Systems Review, 34(5): 186-201 (Dec. 1999).

(Continued)

*Primary Examiner* — Michael C Lai
(74) *Attorney, Agent, or Firm* — Jennifer R. Davis; Michael J. Chang, LLC

(57) ABSTRACT

Techniques for adaptive query targeting in a dynamic distributed computing environment are provided. In one aspect, a method for adaptive query targeting in a distributed computing system having two or more cooperating nodes is provided. The method includes the steps of: using a peer selection criteria to select one or more of the nodes as target peers for a query from a querying node; leasing the query to the target peers for a given length of time via a lease having a given lifetime; periodically refreshing the query during the lifetime of the lease by re-evaluating the peer selection criteria such that the query persists on one or more of the target peers for the lifetime of the lease; and having the query removed from the target peers when the lease expires.

14 Claims, 6 Drawing Sheets

(56) References Cited

U.S. PATENT DOCUMENTS

2007/0288470 A1* 12/2007 Kauniskangas ..... H04L 12/2809

OTHER PUBLICATIONS

Lobo et al., "Distributed State Machines: A Declarative Framework for the Management of Distributed Systems," 8th International Conference on Network and Service Management (SVSM) and 2012 Workshop on Systems Virtualization Management (SVM), pp. 224-228 (Oct. 2012).
I. Brunkhorst et al., "Distributed queries and query optimization in schema-based p2p-systems," First International Workshop, DBISP2P 2013, vol. 2944 of the series Lecture Notes in Computer Science, pp. 184-199 (Sep. 2003).
M. Demirbas et al., "Peer-to-peer spatial queries in sensor networks," Proceedings Third International Conference on Peer-to-Peer Computing P2P2003 (2003) (8 pages).
B. Chen et al., "An approach for heterogeneous and loosely coupled geospatial data distributed computing," Computers & Geosciences, 36(7), pp. 839-847 (Jul. 2010).

\* cited by examiner

ADAPTIVE QUERY TARGETING IN A DYNAMIC DISTRIBUTED ENVIRONMENT

STATEMENT OF GOVERNMENT RIGHTS

This invention was made with Government support under Contract number W911NF-06-3-0002 awarded by Department of the U.S. Army. The Government has certain rights in this invention.

FIELD OF THE INVENTION

The present invention relates to distributed computing systems, and more particularly, to techniques for adaptive query targeting in a dynamic distributed computing environment.

BACKGROUND OF THE INVENTION

With a distributed computing system in which multiple compute nodes are working together, it is useful to be able to exchange information between these nodes. The information shared may be, but is not limited to, sensor data such as temperature, speed, location, etc., or may be application state such as progress in a workflow. It is desirable to enable nodes to request this information from other nodes.

Systems exist which enable such queries between nodes. See, for example, Adjie-Winoto et al., "The design and Implementation of an intentional naming system," $17^{th}$ ACM Symposium on Operating Systems Principles (SOSP '99), Operating Systems Review, 34(5): 186-201 (December 1999) (hereinafter "Adjie-Winoto"). The techniques described in Adjie-Winoto support discovery of nodes in a dynamic environment and targeting queries at nodes based on a prescribed attribute/value pair node naming convention. These techniques, however, only target queries at specific entities for static, one-time queries.

With distributed computing environments, information is constantly changing. Thus, systems which allow for the continuous re-evaluation of the target nodes and the management of the continuous queries across those nodes would be desirable, for example, to continuously query only nodes (which are moving) that are within a defined distance of a specific location.

SUMMARY OF THE INVENTION

The present invention provides techniques for adaptive query targeting in a dynamic distributed computing environment. In one aspect of the invention, a method for adaptive query targeting in a distributed computing system having two or more cooperating nodes is provided. The method includes the steps of: using a peer selection criteria to select one or more of the nodes as target peers for a query from a querying node; leasing the query to the target peers for a given length of time via a lease having a given lifetime; periodically refreshing the query during the lifetime of the lease by re-evaluating the peer selection criteria such that the query persists on one or more of the target peers for the lifetime of the lease; and having the query removed from the target peers when the lease expires.

A more complete understanding of the present invention, as well as further features and advantages of the present invention, will be obtained by reference to the following detailed description and drawings.

DETAILED DESCRIPTION OF PREFERRED EMBODIMENTS

Provided herein is a decentralized software platform run by each node in a distributed computing environment that enables dynamic peer discovery and allows for messages to be sent between nodes once they are discovered. Namely, as highlighted above, in a distributed computing environment, it is desirable to enable nodes to request information (e.g., sensor data such as temperature, speed, location, etc., application state information such as progress in a workflow, etc.) from other nodes, and further to a) specify which data it is they are interested in and b) which nodes they are interested in receiving the information from. Static one-time queries, however, do not permit dynamic tracking of this information. Namely, nodes will want to be dynamically updated with notifications of changes to the requested information (e.g., new temperature reading).

According to the present techniques, this capability is captured in the form of a data subscription from one node to one or more other nodes. The subscription consists of a query (e.g., what data and the conditions on that data) and a specification of the target nodes that should be sharing the information. For instance, the query may be for all temperatures above some threshold value and the target node specification may be to indicate all nodes within a certain distance of a given location. This capability allows for the targeted capture of shared data from nodes defined by a set of criteria on those nodes. This is particularly relevant in a dynamic population of distributed nodes, perhaps mobile, in which the attributes on the nodes used to select a target node (e.g., location) may be changing.

Figure 1:
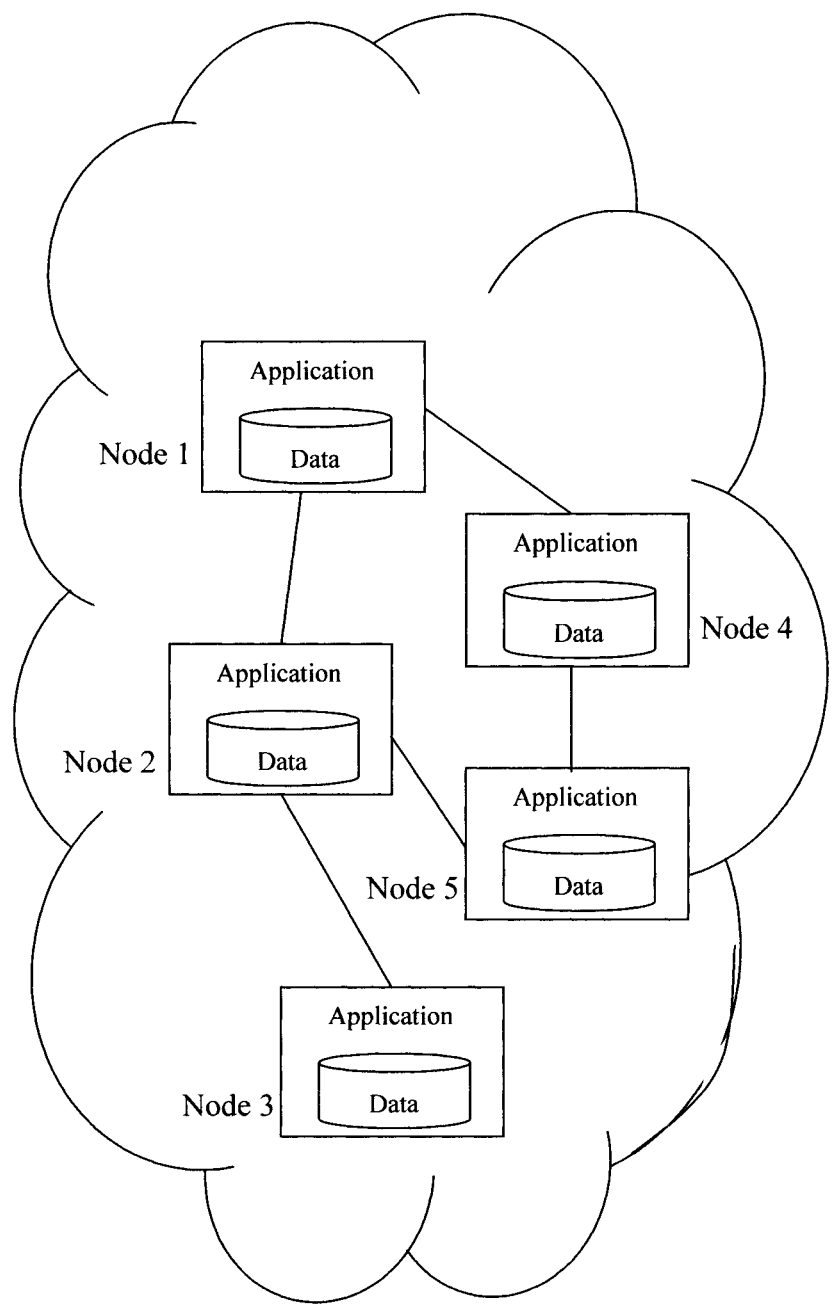
FIG. 1 is a diagram illustrating an exemplary distributed computing environment according to an embodiment of the present invention.

An exemplary distributed state machine in which the present techniques may be employed is shown illustrated in FIG. 1. The distributed state machine shown in FIG. 1 includes a plurality of computational nodes (i.e., Nodes 1-5). Each node has local data/information that may be exchanged with one or more other (remote) nodes in this distributed computing environment. Namely, a distributed state machine (DSM) architecture is modeled on a distributed set of application nodes, wherein each node maintains its own data locally. The nodes collaborate to solve a common problem by sharing data as necessary. An application will be distributed among the different nodes, and communication between the nodes will occur through the distributed state machine.

A distributed computing environment can be implemented in a variety of different contexts. In the generic example shown in FIG. 1, the distributed computing environment includes applications which are collaborating to solve a distributed problem. To do so, the nodes communicate with each other by exchanging data. In this manner, data that is collected/processed locally at the nodes is then shared with the other nodes as defined by the application. Changes in local data (e.g., changes in sensor data collected by a node) that is shared with other peer application nodes can trigger the peer nodes to take appropriate action in response to the changes.

For instance, the nodes can be working on a common workflow. In that scenario it is advantageous for the nodes to be able to share with each other their progress on the workflow as the work is completed. This would require updated data exchange. A mobile network is a type of distributed computing environment, wherein the mobile devices in the network are the nodes. The mobile device nodes can collaborate in sensor data (temperature, humidity, etc.) collection and processing via sensors on the mobile devices. It is assumed herein that at least one node is requesting information from at least one other node in the network.

According to the present techniques, each of the nodes will run a software platform that enables the exchange of information between the nodes when the nodes are discovered. For instance, the nodes might be part of a mobile network. Constraints can be set on the information exchange between nodes, for example, to those nodes that are within a certain distance, to those nodes within a geographic area, etc. As it should be apparent, in a distributed computing environment like a mobile network, the nodes that meet these criteria can constantly change. The present techniques advantageously refresh the queries to update the information pool. Further, as highlighted above, the information pertinent to the queries can also change. For instance, if the information relates to sensor data such as temperature, then updated values are constantly needed. The present techniques can accommodate both changes in the source of the information (changing nodes) as well as changes in the information itself (e.g., changes in sensor data values, changes in workflow progress, etc.).

Reference will be made herein to the querying node(s) which is the node(s) requesting information from one or more other nodes (i.e., "target peer nodes" or simply "target peers") in the network. A target peer is the node to which the query (from the querying node) is directed. Target peers can change over time, for instance, as mobile users move in/out of a geographic area. As shown in FIG. 1, logical topology relationships are defined by the application in the distributed space. For instance, the application might specify that data is to be shared between a parent node (e.g., the querying node) and a child node (e.g., the target peer(s)). By way of example only, Nodes 1 and 2 illustrate such a relationship in FIG. 1.

The present software platform is run on the nodes. In order to provide a decentralized structure, the present software platform is run on each of the nodes. That way, each node can subscribe to information on one or more other nodes independently, and independently regulate refreshing requests, time outs, and changes in the available information pool. As such, a multitude of different types of requests can be easily handled and maintained by the application at the node level.

The present techniques support automated peer discovery and monitoring. Namely, the target peer nodes meeting the peer selection criteria can change over time as nodes (e.g., querying and/or target nodes) move in/out of a target area, move in relation to one another, etc. A peer listener is employed to find and monitor other peers using multi-cast, centralized or hybrid discovery techniques which, as known in the art, range from unstructured peer-to-peer discovery (e.g., where new members broadcast connection information over the multicast address/port to which other members can respond to establish communications with the new members) to structured server/client techniques, and hybrids scenarios thereof (e.g., where a central server helps peers find one another).

As noted above, with a distributed state machine (DSM) architecture, nodes collect and store their data locally. The application queries define how this data is shared with other nodes. Advantageously, the present techniques support both relational and Java data models for sharing this data amongst the nodes. Each of these models is described, for example, in Lobo et al., "Distributed State Machines: A Declarative Framework for the Management of Distributed Systems," 8$^{th}$ International Conference on Network and Service Management (SVSM) and 2012 Workshop on Systems Virtualization Management (SVM), pgs. 224-228 (October 2012), the contents of which are incorporated by reference as if fully set forth herein. For instance, sharing Java objects involves using a hash table to map the names associated with shared data to the shared Java instance data. With relational data sharing models, each node can run an input/output state machine, wherein a state of the machine is represented by a set of relational tables. Table updates occur whenever the state machine receives input from applications run on the node or from state machines in other nodes.

As will be described in detail below, the present techniques support continuous or synchronous (i.e., at the same time) queries of remote shared data, thereby enabling dynamic updates and notifications of changes to the requested data. Data queries are targeted at one or more target peer nodes in the distributed computing space. The present techniques support location-based, name-based, topology-based, etc. addressing. For instance, topology-based addressing focuses on the logical topology relationships established by the application, such as parent and child nodes. See above. Location-based addressing takes into account the physical location of the nodes when evaluating peer selection criteria. Namely, peers can be selected based on the location of the querying node and/or the location of the peers. For example, the set of peers can be restricted based on the distance between the querying node and the peers.

Figure 2:
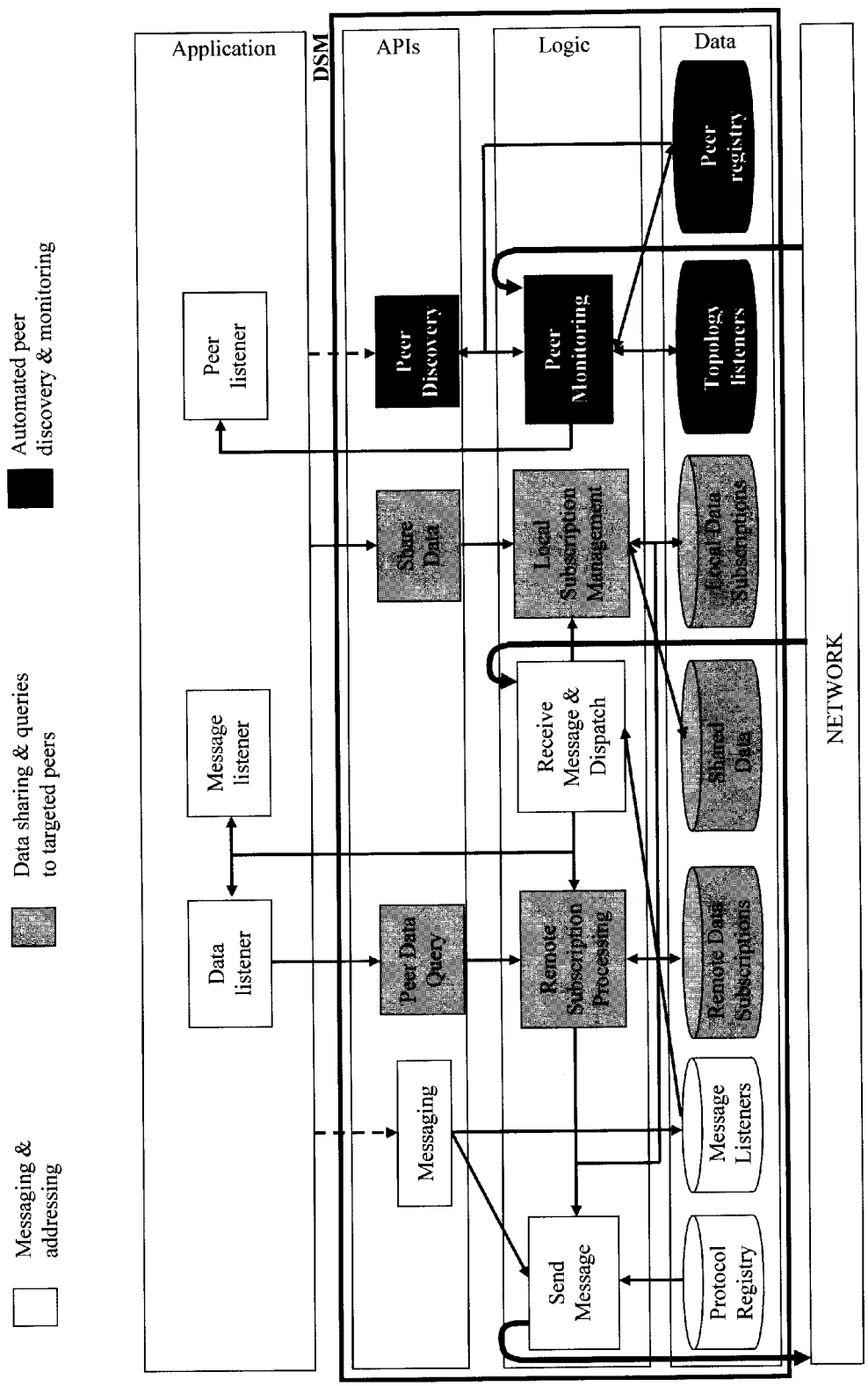
FIG. 2 is a diagram illustrating an exemplary distributed state machine (DSM) architecture according to an embodiment of the present invention.

FIG. 2 provides an exemplary node architecture which employs the above-described i) messaging and addressing, ii) data sharing and query direction to targeted peers, and iii) automated peer discovery and monitoring capabilities. FIG. 2 illustrates an exemplary configuration of the platform run at a given one of the nodes in the exemplary distributed state machine (DSM) of FIG. 1.

As schematically illustrated in FIG. 2, applications run on the nodes collaborate to solve a distributed problem. For instance, the application can employ listeners for data and message receipt from peer nodes. Listeners can also be employed for peer discovery and monitoring. As shown in FIG. 2, data is stored (Data) and processed (Logic) locally at each node. The processed data interfaces with the application via application program interfaces or APIs.

With regard to messaging and addressing, the application can coordinate messaging (sending/receiving messages). As provided above, message listeners can be employed to detect incoming messages. A protocol registry is employed to allow nodes to use different protocols but still allow inter-node communication.

With regard to data sharing and query direction to targeted peers, data relating to both local subscriptions (i.e., data subscriptions handled locally at the node) and remote subscriptions (those containing queries leased to peer nodes—see below) are stored locally at each node. As shown in FIG. 2, management of local subscriptions can involve processing shared data received from peer nodes, and storing that processed shared data locally. Processing of data queries from peer nodes (i.e., based on a remote subscription wherein, e.g., the instant node is a target peer of a subscription from another node—see below) can involve sending data (stored locally, i.e., remote data subscription data) via the above-described messaging process to the requesting node(s) via the network. For instance, upon receipt of a message/query from a peer node (see, for example, FIG. 5 described below), this (remote) query is processed, the queried data is retrieved, and the reply is sent to the querying peer node.

With regard to automated peer discovery and monitoring capabilities, peer listeners can be installed and are called when new peer nodes are discovered. Various standard implementations of discovery protocols including multicast or a centralized registry can be used. Once discovered, whether listened for or not, a peer node is available as a target for a query.

Figure 3:
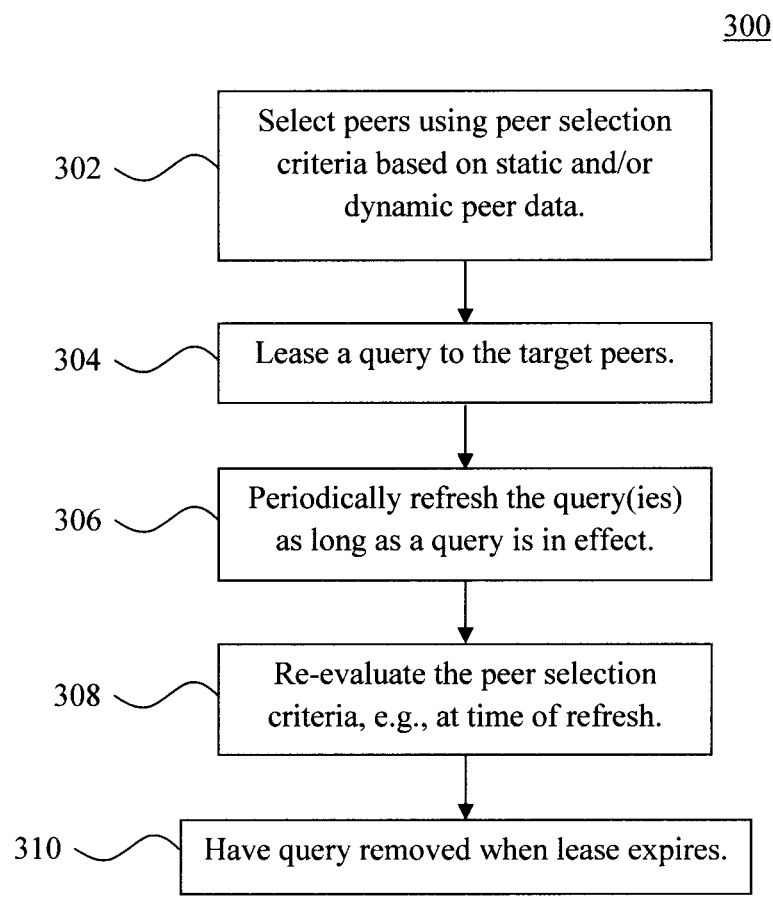
FIG. 3 is a diagram illustrating an exemplary methodology for adaptive query targeting in a distributed computing system according to an embodiment of the present invention.

An overview of the present techniques is now provided by way of reference to methodology 300 of FIG. 3. Methodology 300 is performed in the context of a distributed computing environment with two or more cooperating peer nodes (see for example FIG. 1, described above), wherein any of the nodes can issue a query to one or more of its peers (see for example FIG. 2, described above).

In step 302, peer selection criteria is used (by a node) to select target peers for a query. Queries generally represent conditions placed on remote data (i.e., the data stored locally at one or more peer nodes), such as name of data, type of data (e.g., temperature value data), location, etc. Queries can be targeted to one or more peer nodes based on the peer selection criteria.

The peer selection criteria can be based on static (e.g., name-based addressing—see above) or dynamic data associated with the peers. By way of example only, dynamic peer data used to select the peers can be based on location information pertaining to the location of the querying and/or the location of the peers. For instance, this location information can be used to restrict the set of peers based on a distance between the querying node and the peers. To use a simple example to illustrate this principle, the task at hand might involve collecting/processing data from a certain geographical location. In that case it would make sense to employ geographical constraints in the selection criteria. Furthermore, distance constraints can control the size of the sampling population for the data.

Once a target peer or peers is/are selected (based on the selection criteria), in step 304 a query is leased to the one or more target peers. The term "lease" as used herein implies that the query is established for a limited length of time, after which the lease expires and the query is removed from the queried peer (see below). Reference is also made herein to "subscriptions" which generally are agreements by the querying node to receive data from the target peer(s) throughout the lifetime of the lease. Each subscription includes a query and a target peer selection (i.e., criteria for selecting target peers for the respective query). The present queries can be made continuous meaning that they persist on the target peer nodes. This involves maintaining all current subscriptions. As will be described in detail below, maintaining a subscription can involve (periodically) refreshing the subscriptions during the lifetime of the query lease. During which time, the peer selection can be re-evaluated (based on the selection criteria) to adapt the target peers of the (continuous) query, e.g., potentially adding (new target peers that match the criteria) and/or removing peers (that no longer meet the criteria) from the set of targets for the query.

In step 306, the subscription (i.e., query and peer selection criteria) is periodically refreshed during the lifetime of the lease. According to an exemplary embodiment, the refresh period is a predetermined length of time x, which can be set depending on the application at hand. By way of example only, lease times can be from about 10 seconds to about 60 seconds, and ranges therebetween, but will depend on the aspects of network and application. Shorter values will use more network traffic but will allow the queried nodes to stop processing old queries more quickly. Longer lease times require less re-leasing traffic, but will cause the queried nodes that are no longer targeted to continue to process the queries unnecessarily. Thus, as long as the lease is in effect the subscription will be periodically refreshed every x (seconds, minutes, etc.).

During the subscription refresh, the query re-evaluates the peer selection criteria against the current set of targets for the query and any potentially new targets. See step 308. Namely, the peers meeting the selection criteria in step 302 may (or may not) have changed, and as such the set of (peer) targets for the query needs to be updated. For instance, using location data as the selection criteria whereby the peers have to be within a certain distance from the querying node, over time the location of the querying node and/or the peers might change. Thus, during refreshing of the subscription, peers that no longer meet the location criteria are removed from the set of targets for the query. New peers that meet the criteria are added to the set of targets. Peers that continue to meet the selection criteria remain in the target set. Peers that are removed from the target set may be contacted directly to remove the remote query, but if not, then the lease will time out on the node causing the remote query to be terminated.

Finally, when the lease on a query node expires, the querying node has the query removed from the queried node. See step 310. For instance, in the case of sensor data collection and processing the window for analysis might be over a given period of time, e.g., a 24 hour period, a week, a month, etc. after which time the lease expires and the query is removed from the peer nodes. Removal of the query actually occurs at the queried node. However, as highlighted above, peers may be contacted directly (e.g., by the querying node) to remove the remote query, or the lease can simply time out on the node causing the remote query to be terminated.

An important concept of the present techniques is that all subscription leases are maintained throughout the lifetime of the lease. As described above, this involves refreshing the subscriptions as long as the lease is in effect. The refresh happens periodically. See, for example, methodology 400 of FIG. 4. This is important in mobile networks in which network connectivity may be lost between querying and queried nodes.

Figure 4:
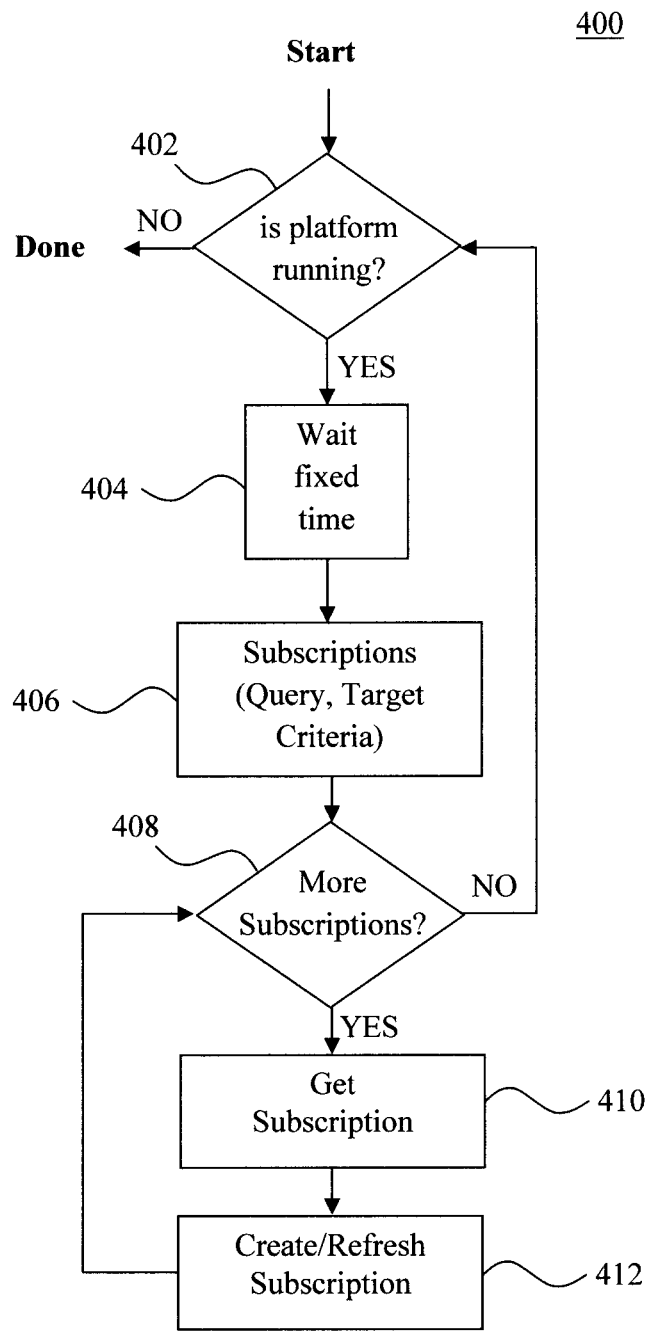
FIG. 4 is a diagram illustrating an exemplary methodology for maintaining subscription leases according to an embodiment of the present invention.

As shown in FIG. 4, once it is determined that the present software platform is running on a peer node(s) (step 402), then in step 404 a predetermined wait time is imposed. This wait time corresponds to the above-described subscription refresh period. Namely, as described in conjunction with the description of step 306 of FIG. 3 above, each subscription is refreshed periodically during the lifetime of the lease, wherein the refresh period is a predetermined length of time x.

After the requisite refresh period has elapsed, each subscription (i.e., a query and the peer selection criteria for the respective query) is refreshed. To do so, each subscription is evaluated in turn and, if necessary, peers are added and/or removed from the set of targets for the query. Specifically, in step 406 a first subscription is refreshed, at which time the peer selection criteria for the respective query is re-evaluated against the current set of targets. Should one or more target peers no longer meet the selection criteria, then they are removed from the set of targets during the refresh. Likewise, if one or more new target peers meet the selection criteria, then they are added to the set of targets during the refresh.

A determination is made in step 408 as to whether there are additional subscriptions to evaluate during the refresh. If it is determined in step 408 that (YES) there are additional subscriptions to evaluate, then each additional subscription is evaluated in turn. Namely, in step 410, the next subscription is evaluated, and in step 412 that subscription is refreshed in the manner described above. This process can be iterated until all subscriptions have been refreshed, thereby actively maintaining all subscription leases. During this process, any new subscriptions (i.e., a new query and corresponding peer selection criteria) can be created (see, for example, step 412) and added to the refresh loop.

If/when it is determined in step 408 that (NO) there are no additional subscriptions to evaluate, then the process is repeated. Accordingly, the same (predetermined) refresh period is imposed before each subscription is again evaluated and/or new subscriptions are created.

Figure 5:
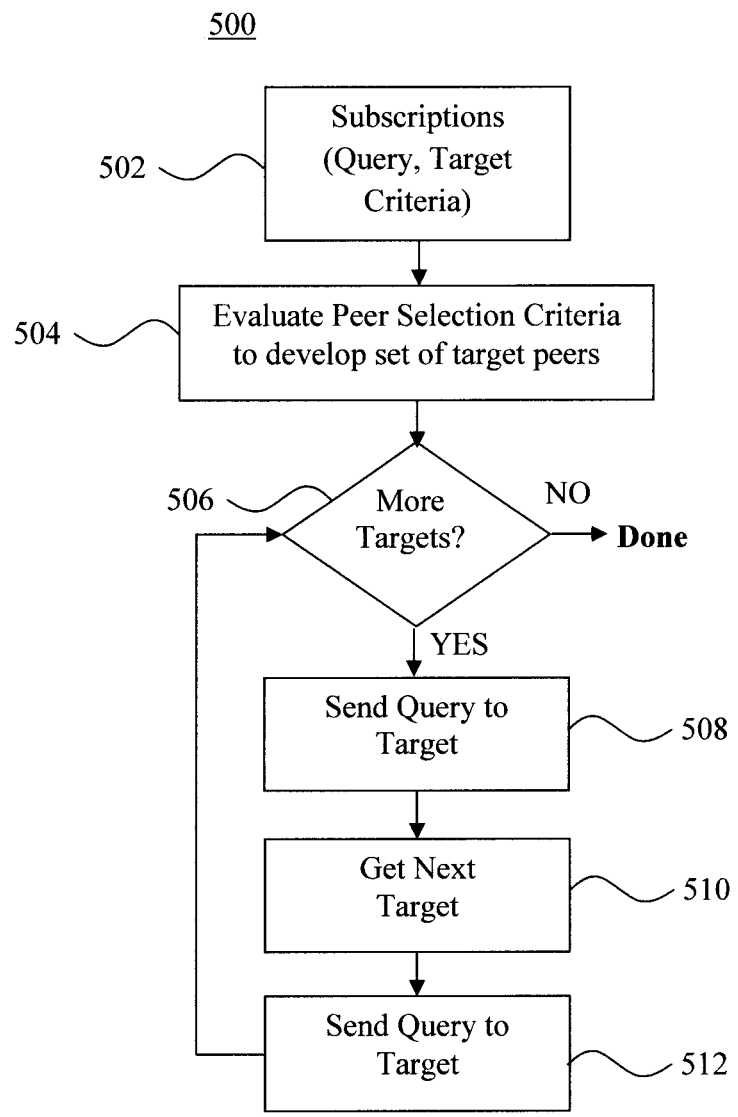
FIG. 5 is a diagram illustrating an exemplary methodology for creating/refreshing remote subscriptions according to an embodiment of the present invention.

The process for creating/refreshing remote subscriptions is described in further detail by way of reference to methodology 500 of FIG. 5. As detailed above, each subscription being created or refreshed (see step 502) includes a query and a peer selection criteria for the query. In step 504, the peer selection criteria are evaluated to develop (or re-develop in the case of a refresh) a set of target peers for the query. Each target peer is then sent the query that is part of the subscription. For instance, in step 506 a determination is made as to whether there are targets for the query. If it is determined in step 506 that (YES) there are targets for the query, then in step 508 the query is sent to a first one of the targets meeting the selection criteria. A next one of the targets is then selected in step 510, and in step 512 the query is sent to that target, and so on. The process is iterated until the query has been sent to all targets in the set of target peers. If/when it is determined in step 506 that (NO) there are no more targets to which the query needs to be sent, then the process ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
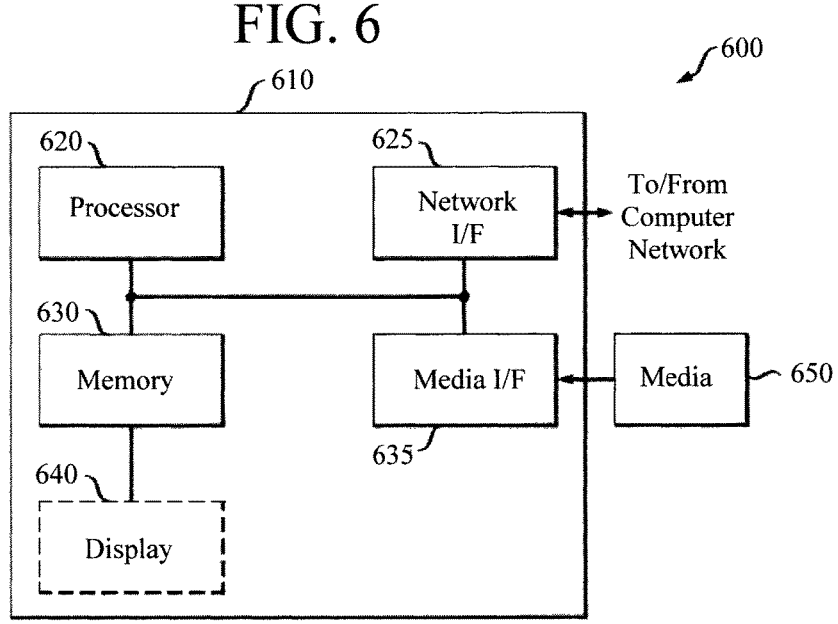
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 300 of FIG. 3, one or more of the steps of methodology 400 of FIG. 4 and/or one or more of the steps of methodology 500 of FIG. 5.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for adaptive query targeting in a distributed computing system having two or more cooperating nodes, the method comprising:
    using a peer selection criteria to select one or more of the nodes as target peers for a query from a querying node;
    leasing a subscription to the target peers for a given length of time via a lease having a given lifetime, wherein the subscription comprises the query and the peer selection criteria for the query;
    periodically refreshing the subscription during the lifetime of the lease by re-evaluating the peer selection criteria of the subscription against the target peers such that the query persists on one or more of the target peers for the lifetime of the lease, wherein re-evaluating the peer selection criteria comprises:
        removing target peers that no longer meet the peer selection criteria; and
        adding new target peers that meet the peer selection criteria; and having the query removed from the target peers when the lease expires.

2. The method of claim 1, wherein the query comprises conditions placed on data stored locally at one or more of the target peers.

3. The method of claim 1, wherein the peer selection criteria is based on static data associated with the target peers.

4. The method of claim 1, wherein the peer selection criteria is based on dynamic data associated with the target peers.

5. The method of claim 4, wherein the peer selection criteria is based on a location of the querying node and locations of the target peers.

6. The method of claim 5, wherein the peer selection criteria comprises distances between the querying node and the target peers.

7. The method of claim 1, wherein the subscription is periodically refreshed after a predetermined length of time x.

8. The method of claim 1, further comprising:
maintaining the subscription for the lifetime of the lease.

9. The method of claim 1, further comprising:
evaluating the peer selection criteria to develop a set of the target peers for the query.

10. The method of claim 9, further comprising:
sending the query to each of the target peers in the set of target peers for the query.

11. A computer program product for adaptive query targeting in a distributed computing system having two or more cooperating nodes. the computer program product comprising a computer readable storage medium having program instructions embodied therewith, the program instructions executable by a computer to cause the computer to:
use a peer selection criteria to select one or more of the nodes as target peers for a query from a querying node;
lease a subscription to the target peers for a given length of time via a lease having a given lifetime, wherein the subscription comprises the query and the peer selection criteria for the query;
periodically refresh the subscription during the lifetime of the lease by re-evaluating the peer selection criteria of the subscription against the target peers such that the query persists on one or more of the target peers for the lifetime of the lease, wherein the program instructions when re-evaluating the peer selection criteria further cause the computer to:
remove target peers that no longer meet the peer selection criteria; and
add new target peers that meet the peer selection criteria; and have the query removed from the target peers when the lease expires.

12. The computer program product of claim 11, wherein the peer selection criteria is based on dynamic data associated with the target peers.

13. The computer program product of claim 12, wherein the peer selection criteria is based on a location of the querying node and locations of the target peers.

14. The computer program product of claim 11, wherein the subscription is periodically refreshed after a predetermined length of time x.

* * * * *